(12) United States Patent
Linsel

(10) Patent No.: US 10,570,946 B2
(45) Date of Patent: Feb. 25, 2020

(54) BLIND RIVET-NUT AND METHOD FOR SECURING A COMPONENT TO A CARRIER

(71) Applicant: Ford Global Technologies, LLC, Dearborn, MI (US)

(72) Inventor: Jens Linsel, Cologne (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 232 days.

(21) Appl. No.: 15/637,323

(22) Filed: Jun. 29, 2017

(65) Prior Publication Data

US 2018/0003210 A1    Jan. 4, 2018

(30) Foreign Application Priority Data

Jul. 1, 2016 (DE) .................. 10 2016 212 024

(51) Int. Cl.
*F16B 37/06* (2006.01)
*F16B 19/10* (2006.01)
(Continued)

(52) U.S. Cl.
CPC ........ *F16B 37/067* (2013.01); *F16B 19/1072* (2013.01); *F16B 37/127* (2013.01);
(Continued)

(58) Field of Classification Search
CPC ........ F16B 5/04; F16B 19/04; F16B 19/1072; F16B 25/00; F16B 37/042; F16B 37/067;
(Continued)

(56) References Cited

U.S. PATENT DOCUMENTS 2,763,314 A * 9/1956 Gill ...................... F16B 33/002
                                                              29/509
3,461,771 A * 8/1969 Briles ................. F16B 19/1054
                                                              403/408.1
(Continued)

FOREIGN PATENT DOCUMENTS

DE        7401302        4/1974
DE        3513644       10/1986
(Continued)

OTHER PUBLICATIONS

German Exam Report dated Feb. 22, 2017 corresponding to German Application Serial No. DE 10 2016 212 024.7 filed Jul. 1, 2016.

*Primary Examiner* — Roberta S Delisle
(74) *Attorney, Agent, or Firm* — Vichit Chea; Brooks Kushman P.C.

(57) ABSTRACT

A blind rivet-nut having an annular-flange-like setting head and a hollow shaft for securing a blind rivet-nut in an opening of a carrier. The hollow shaft has a free end having a threaded portion for receiving a threaded element of a tensioning tool. A clamping portion adjacent to the setting head forms a bead-like deformation when the tensioning tool is used to clamp the carrier between the bead-like deformation and the setting head. A threadless shaft portion is formed between the clamping portion and the threaded portion. The threadless shaft portion is threaded by a thread self-rolling or thread self-tapping fastener. The fastener is received in a positive-locking manner when the fastener is screwed into the thread formed on the previously threadless shaft portion. A method is also disclosed for securing a component to a carrier by a blind rivet-nut.

9 Claims, 3 Drawing Sheets

(51) Int. Cl.
*F16B 37/12* (2006.01)
*B21J 15/42* (2006.01)
*F16B 37/04* (2006.01)

(52) U.S. Cl.
CPC ............. *B21J 15/42* (2013.01); *F16B 37/042* (2013.01); *F16B 37/06* (2013.01)

(58) Field of Classification Search
CPC ......... F16B 37/127; F16B 37/06; B21J 15/42; Y10T 29/49943; Y10T 29/49956
USPC ................................ 411/172, 173, 183, 501
See application file for complete search history.

(56) References Cited

U.S. PATENT DOCUMENTS

| | | | |
|---|---|---|---|
| 3,750,525 A * | 8/1973 | Waters | F16B 19/008 411/181 |
| 3,789,728 A * | 2/1974 | Shackelford | F16B 37/067 411/34 |
| 3,797,358 A * | 3/1974 | Allender | F16B 13/061 411/38 |
| 5,051,048 A * | 9/1991 | Maddox | F16B 19/1072 411/34 |
| 8,434,984 B2 * | 5/2013 | Toosky | F16B 19/10 411/360 |
| 8,936,422 B2 * | 1/2015 | Makino | F16B 37/067 411/183 |
| 2006/0045649 A1 | 3/2006 | Johnson et al. | |
| 2013/0205573 A1 | 8/2013 | Kashimura | |
| 2014/0130335 A1 | 5/2014 | Bickford et al. | |

FOREIGN PATENT DOCUMENTS

| | | |
|---|---|---|
| DE | 4100709 | 7/1992 |
| DE | 60023115 | 7/2006 |
| DE | 102013101178 | 8/2013 |
| DE | 202015100359 | 5/2015 |
| EP | 0936362 | 8/1999 |

* cited by examiner

BLIND RIVET-NUT AND METHOD FOR SECURING A COMPONENT TO A CARRIER

CROSS-REFERENCE TO RELATED APPLICATIONS

This application claims foreign priority benefits under 35 U.S.C. § 119(a)-(d) to DE 10 2016 212 024.7 filed Jul. 1, 2016, which is hereby incorporated by reference in its entirety.

TECHNICAL FIELD

The present invention relates to a blind rivet-nut for securing a component to a carrier by means of a blind rivet-nut and a method for securing a component to a carrier by means of a blind rivet-nut.

BACKGROUND

A blind rivet-nut set on a carrier, in particular a component produced from sheet metal, is intended to be securely connected in order to provide it with a securing thread which can be used to secure a bolt or a screw. Blind rivet-nuts can further serve to connect two or more thin-walled carriers or components to each other.

A rivet-nut comprises a setting head which is intended to contact a first side of the carrier and a hollow shaft which is configured to be inserted in a through-hole of the carrier. The hollow shaft comprises a clamping portion which is intended, under the action of an axial pulling force, to become deformed to form a bead which moves into abutment with the second side of the carrier so that the carrier is clamped to ensure the retention of the nut on the carrier. Furthermore, the nut is set in a blind manner the nut is set in the region of the second side of the carrier without access to this second side. Generally, the shaft of a blind rivet-nut comprises a threaded portion for receiving a threaded element, wherein the threaded element enables the axial pulling force which is required to deform the clamping portion to be applied to the hollow shaft. This threaded portion is subsequently used to screw in a screw or a bolt which is intended to be secured to the blind rivet-nut. Such a blind rivet-nut is known, for example, from DE 20 2015 100 359 U2.

The screwing of the threaded element into the threaded portion requires precise straight positioning and centering of the threaded element on the threaded portion so that the threaded element is not placed in an oblique manner on the thread and consequently becomes jammed during the screwing-in operation.

SUMMARY

Against this background, an object of the present invention is to provide a blind rivet-nut which is improved with respect to use during large-batch production and in which tilting and jamming of a screw or a bolt which is intended to be secured to the blind rivet-nut is prevented during screwing into the blind rivet-nut to the greatest possible extent. Furthermore, a securing arrangement and a securing method having the same advantageous properties are intended to be set out.

It should be noted that the features which are set out individually in the claims can be combined with each other in any technically advantageous manner and set out other embodiments of the invention. The description further characterizes and specifies the invention with specific references to the Figures.

According one aspect of the invention, a blind rivet-nut for blind riveting in an opening of a carrier comprises, for example, a thin-walled metal sheet, an annular-flange-like setting head and a hollow shaft. The hollow shaft has at the free end thereof opposite the setting head a threaded portion for receiving a threaded element, for example, a screw or a bolt, and a clamping portion which is adjacent to the setting head. The clamping portion is intended, during a setting operation of the blind rivet-nut on the carrier, to become deformed in a bead-like manner in order thus to clamp the carrier between the bead-like deformation of the clamping portion and the setting head. The invention further makes provision for an additional threadless shaft portion to be formed in the hollow shaft between the clamping portion and the threaded portion. This threadless shaft portion is suitable and constructed for receiving a thread self-rolling or thread self-tapping screw or bolt in a positive-locking manner therein when the screw/bolt is screwed into the shaft portion.

The term thread self-rolling is intended to be understood to be a non-cutting introduction of a thread by means of the screw or the bolt into the thread-free shaft portion of the blind rivet-nut when it is screwed into the threadless shaft portion, whereas a thread self-tapping operation is intended to be understood to be introduction involving cutting of the thread by means of the screw or the bolt into the threadless shaft portion of the blind rivet-nut when it is screwed into the threadless shaft portion. As used herein the term "self-tapping" is intended to refer to both self-rolling and self-tapping fasteners. A positive-locking receiving of the screw or the bolt in the shaft portion is produced when the screw or the bolt has introduced the thread into the threadless shaft portion and the screw or the bolt is screwed into this thread. The screw or the bolt serves, for example, to secure another component to the blind rivet-nut or to the carrier.

A specific advantage of the blind rivet-nut according to the invention is that the securing screw or the securing bolt can neither tilt nor become jammed when it is screwed into the threadless shaft portion since it forms the thread itself only when it is screwed into the threadless shaft portion. Furthermore, the threadless shaft portion advantageously leads to a self-centering of the securing screw or the securing bolt in the threadless shaft portion of the blind rivet-nut during the screwing-in operation.

An advantageous embodiment of the invention makes provision for the threadless shaft portion to have a hole diameter which is smaller than the diameter of the clamping portion and greater than the diameter of the threaded portion. It can thereby be ensured that only the clamping portion with the largest hole diameter becomes plastically deformed during a setting operation of the blind rivet-nut on the carrier, but not the threadless shaft portion and the threaded portion.

The wall thickness of the threadless shaft portion may be sized in such a manner in this instance that the threadless shaft portion substantially does not become plastically deformed during the setting operation of the blind rivet-nut on the carrier.

Furthermore, the wall thickness of the threadless shaft portion may always be sized in such a manner that an inner thread can be rolled or cut in this shaft portion. In this instance standards for forming threads known per se to the person skilled in the art can be considered and complied with.

According to another aspect of the present invention, there is provided a securing arrangement which has a component which is secured to a carrier by means of a blind rivet-nut, wherein the blind rivet-nut is blind-riveted in conventional manner in an opening of the carrier and the component is secured to the blind rivet-nut by means of a screw or a bolt. In this instance, the invention makes provision for the blind rivet-nut to be constructed in accordance with one of the embodiments described above. Furthermore, the screw or the bolt is a thread self-rolling or thread self-tapping screw or bolt and this screw or bolt is screwed into the shaft portion of the blind rivet-nut, which portion is threadless before the screwing-in operation, to form a positive-locking receiving member therein for itself.

Other embodiments of the securing arrangement according to the invention whose advantages and effects will be appreciated directly from the preceding description of the blind rivet-nut according to the invention and can accordingly also be applied to the securing arrangement.

According to yet another aspect of the present invention, a method for securing a component to a carrier by means of a blind rivet-nut which is constructed in accordance with one of the embodiments described above is provided. The method has at least the following steps: setting the blind rivet-nut in an opening of the carrier so that the clamping portion of the blind rivet-nut becomes deformed in a bead-like manner during the setting operation of the blind rivet-nut and the carrier is clamped between the bead-like deformation of the clamping portion and the setting head of the blind rivet-nut; and securing the component to the blind rivet-nut by screwing a screw or a bolt into the shaft portion of the blind rivet-nut, which portion is threadless before being screwed in, wherein the screw or the bolt is thread self-rolling or thread self-tapping in order to form a positive-locking receiving member for itself in the threadless shaft portion.

In this instance, there are also produced additional embodiments of the securing method according to the invention, whose advantages and effects directly from the preceding description of the blind rivet-nut according to the invention and can accordingly also be applied to the securing method.

Other features and advantages of the invention will be appreciated from the following description of an embodiment (which is not intended to be understood to be limiting) of the invention which will be explained in greater detail below with reference to the drawings. In the schematic drawings:

DETAILED DESCRIPTION

Figure 1:
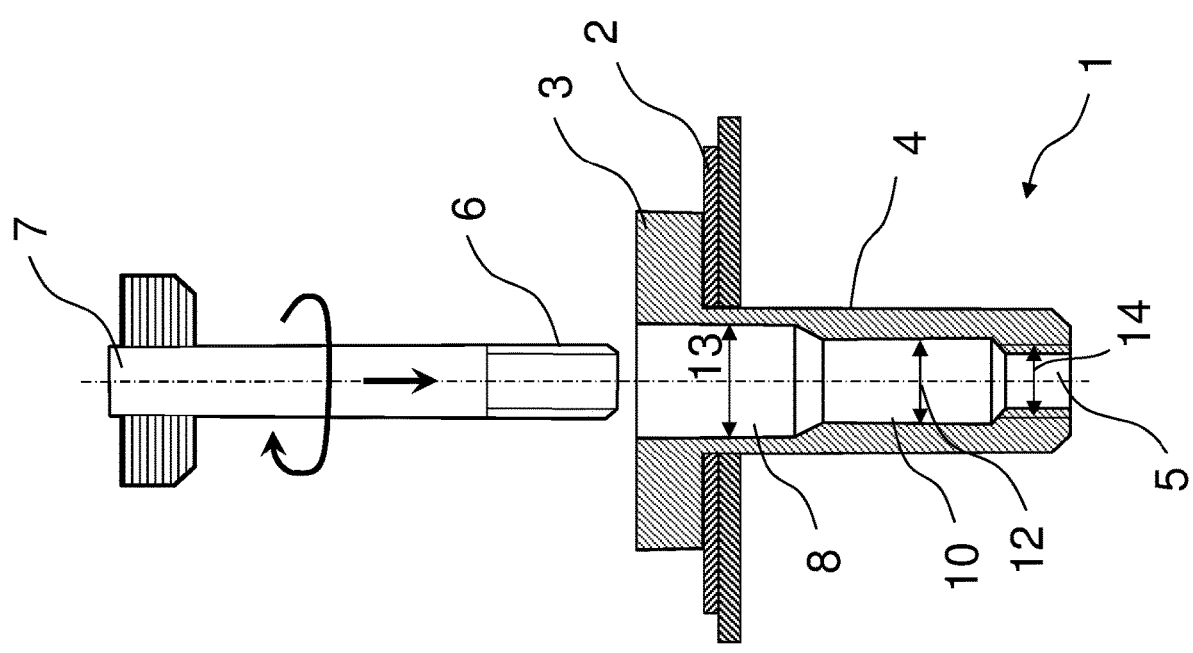
FIG. 1 is a cross-section of an embodiment of a blind rivet-nut according to the invention before a setting operation on a carrier.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of components. Therefore, specific structural and functional details disclosed herein are not to be interpreted as limiting, but merely as a representative basis for teaching one skilled in the art to variously employ the present invention.

In the different Figures, components which are equivalent in terms of their function are always given the same reference numerals so that they are generally also described only once.

FIG. 1 is a cross-section of an embodiment of a blind rivet-nut 1 made according to this disclosure before a setting operation on a carrier 2. FIG. 1 shows that the blind rivet-nut 1 has an annular-flange-like setting head 3 and a hollow shaft 4 which is integrally connected to and adjacent to the setting head 3.

The hollow shaft 4 of the blind rivet-nut 1 illustrated in FIG. 1 comprises at the free end thereof opposite the setting head 3 a threaded portion 5 for receiving a threaded element 6 which is fitted, for example, to a tension screw 7 as shown in FIG. 1. The tension screw 7 serves to set the blind rivet-nut 1 on the carrier 2, as will be further explained with reference to FIG. 2.

Figure 2:
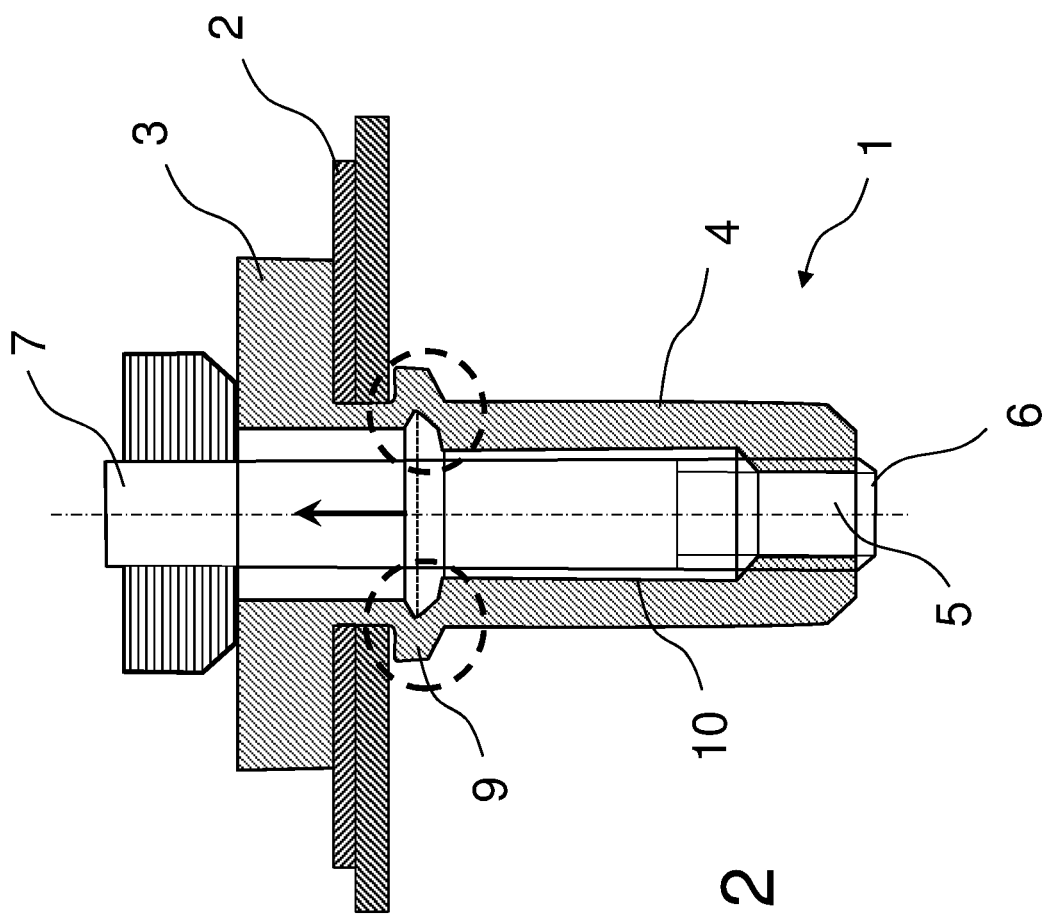
FIG. 2 is a cross-section of the blind rivet-nut from FIG. 1 after the setting operation on the carrier.

Furthermore, the hollow shaft 4 has a clamping portion 8 adjacent to the setting head 3 that deforms in a bead-like manner during a setting operation of the blind rivet-nut 1 on the carrier 2. The bead-like deformation 9 of the clamping portion 8 clamps the carrier against the setting head 3, as illustrated in FIG. 2.

Figure 3:
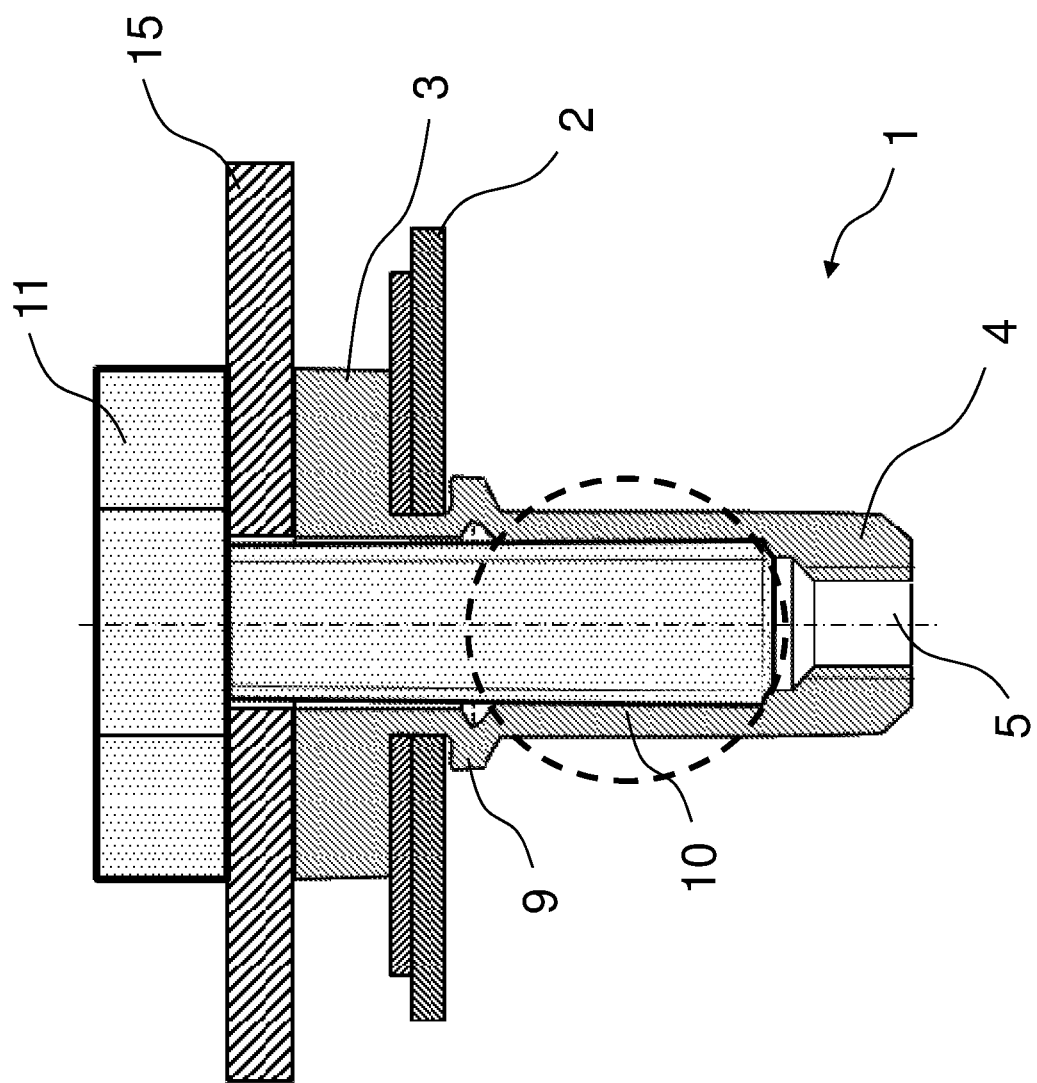
FIG. 3 is a cross-section of the blind rivet-nut from FIG. 2 which is set on the carrier and to which another component is secured.

In the embodiment of the blind rivet-nut 1 illustrated in FIG. 1, a threadless shaft portion 10 is constructed between the clamping portion 8 and the threaded portion 5. This threadless shaft portion 10, or sleeve, is constructed to receive a thread self-rolling or thread self-tapping screw 11 or bolt in a positive-locking manner when the screw/bolt is screwed into the shaft portion 10, as illustrated in FIG. 3.

FIG. 1 further shows that the threadless shaft portion 10 has a hole diameter 12 which is smaller than the diameter 13 of the clamping portion 8 and greater than the diameter 14 of the threaded portion 5. The hollow shaft 4 of the blind rivet-nut 1 as shown in FIG. 4 has a substantially constant outer diameter along the clamping portion 8, the threadless shaft portion 10 and the threaded portion 5. Different wall thicknesses are provided for the clamping portion 8, the threadless shaft portion 10 and the threaded portion 5. The wall thickness of the threadless shaft portion 10 is sized in such a manner that an inner thread can be rolled or cut in the threadless shaft portion 10. The blind rivet-nut 1 when set on the carrier 2 plastically deforms the clamping portion 8 but does not plastically deform the threadless shaft portion 10 during the setting operation.

As indicated in FIG. 1, the blind rivet-nut 1 is first introduced into the opening defined by the carrier 2 and a suitable setting tool, such as a tension screw 7 is used to set the blind rivet-nut 1. The threaded element 6 of the tension screw 7 is screwed into the threaded portion 5 of the blind rivet-nut 1 to apply an axial pulling force to the hollow shaft 4 of the blind rivet-nut 1.

FIG. 2 is a cross-section of the blind rivet-nut 1 from FIG. 1 after setting the blind rivet-nut on the carrier 2. The clamping portion 8 of the blind rivet-nut 1 is plastically deformed by the axial pulling force applied by the tension screw 7. The plastic deformation creates the bead-like deformation 9 of the clamping portion 8. The carrier 2 is clamped between the bead-like deformation 9 of the clamping portion 8 and the setting head 3 after the setting operation.

FIG. 3 is a cross-section of the blind rivet-nut 1 of FIG. 2 set on the carrier 2 and to which another component 15, for example, a metal sheet, is secured by means of the securing screw 11. The thread self-rolling or thread self-tapping securing screw 11 is screwed into the shaft portion 10 to secure the component 15 to the blind rivet-nut 1 or to the carrier 2. The shaft portion 10 is threadless before the self-tapping screw is screwed into the shaft portion 10. The self-tapping screw forms, rolls or cuts a thread into shaft portion 10 and the screw 11 is received in a positive-locking manner in the thread.

The blind rivet-nut according to the invention is used to secure a component to a carrier by means of a thread self-rolling or thread self-tapping screw or bolt. The blind rivet-nut, the securing arrangement and the securing method are, however, not limited to the embodiment described herein, but instead also include other embodiments which have the same effect.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A blind rivet-nut having a setting head and a hollow shaft received in an opening defined by a carrier, wherein the hollow shaft has at a free end opposite the setting head, the free end includes a first threaded portion that is adapted to receive a threaded element of a tensioning tool, the hollow shaft having a clamping portion adjacent to the setting head, the clamping portion being adapted to form a bead-like deformation during a setting operation of the blind rivet-nut on the carrier to clamp the carrier between the bead-like deformation and the setting head, wherein a portion a threadless shaft portion is provided between the clamping portion and the first threaded portion, wherein a self-tapping fastener forms a second thread on an inner surface the threadless shaft portion, and wherein the self-tapping fastener is attached in a positive-locking manner to the second thread.

2. The blind rivet-nut of claim 1, wherein the threadless shaft portion has a hole diameter which is smaller than a first diameter of the clamping portion and greater than a second diameter of the first threaded portion.

3. The blind rivet-nut of claim 1, wherein a wall of the threadless shaft portion has a thickness sufficient to have an inner thread formed in the wall.

4. The blind rivet-nut of claim 1, wherein a wall of the threadless shaft portion has a thickness that is sufficient to resist plastic deformation during a setting operation of the blind rivet-nut on the carrier.

5. An assembly comprising:
   a rivet-nut having a head, a free end, and a sleeve between the head and the free end;
   a carrier defining an opening that receives the rivet-nut, wherein the rivet-nut is compressed to form a bead securing the rivet-nut to the carrier; and
   a self-tapping fastener forming a thread on an inner surface the sleeve that positively locks the self-tapping fastener to the thread.

6. The assembly of claim 5 wherein the rivet-nut is a blind rivet that is deformed by a tensioning tool that engages the free end to pull the free end towards the head and thereby form the bead.

7. The assembly of claim 5 wherein the sleeve has a smooth internal surface until the self-tapping fastener forms the thread on the smooth internal surface.

8. The assembly of claim 5 wherein the rivet-nut has an internal opening including an intermediate portion formed by a smooth internal surface that defines a hole having a smaller internal diameter than a clamping portion of the internal opening that is formed into the bead and a greater internal diameter than an end portion of the internal opening at the free end.

9. A blind rivet nut adapted to be attached to a carrier with a tensioning tool and to secure a component to the carrier, the blind rivet nut comprising:
   a rivet nut sleeve having a setting head and a hollow shaft, the hollow shaft having a first thread on an internal surface of a free end, a thread-less shaft, and a clamping portion, wherein the tensioning tool is inserted into the hollow shaft when the rivet nut is received in an opening defined by the carrier, wherein the tensioning tool has an external thread on a distal end that is received by the first thread on the free end, and wherein the tensioning tool is turned to draw the free end toward the setting head and form a bead on the clamping portion to clamp the carrier between the bead and the setting head; and
   a self-tapping fastener having a thread forming end that is screwed into the thread-less shaft to tap a second thread on an inner surface of the rivet nut, wherein a threaded connection between the thread forming end and the second thread secures the component to the carrier.

* * * * *